United States Patent
Bonifas

(10) Patent No.: US 11,451,754 B2
(45) Date of Patent: Sep. 20, 2022

(54) DISPLAY AND METHOD OF CONSTRUCTING SAME

(71) Applicant: R.R. Donnelley & Sons Company, Chicago, IL (US)

(72) Inventor: Travis Bonifas, Bolingbrook, IL (US)

(73) Assignee: R. R. DONNELLEY & SONS COMPANY, Chicago, IL (US)

(*) Notice: Subject to any disclaimer, the term of this patent is extended or adjusted under 35 U.S.C. 154(b) by 854 days.

(21) Appl. No.: 16/359,578

(22) Filed: Mar. 20, 2019

(65) Prior Publication Data
US 2020/0045272 A1    Feb. 6, 2020

Related U.S. Application Data

(60) Provisional application No. 62/712,731, filed on Jul. 31, 2018.

(51) Int. Cl.
| | | |
|---|---|---|
| G09F 1/04 | (2006.01) | |
| H04N 9/31 | (2006.01) | |
| G03B 21/20 | (2006.01) | |
| G09F 23/10 | (2006.01) | |
| G09F 1/06 | (2006.01) | |
| G09F 23/06 | (2006.01) | |

(52) U.S. Cl.
CPC ....... *H04N 9/3147* (2013.01); *G03B 21/2006* (2013.01); *G09F 1/04* (2013.01); *G09F 1/06* (2013.01); *G09F 23/06* (2013.01); *G09F 23/10* (2013.01)

(58) Field of Classification Search
CPC ..... G09F 1/08; G09F 1/04; G09F 1/06; G09F 23/06; A63H 33/08; A47F 5/112
See application file for complete search history.

(56) References Cited

U.S. PATENT DOCUMENTS

| | | | | |
|---|---|---|---|---|
| 898,519 | A * | 9/1908 | Snelling | G09F 1/06 40/539 |
| 1,822,570 | A * | 9/1931 | Einson | A47F 5/112 40/539 |
| 1,839,806 | A * | 1/1932 | Schwartz | G09F 1/06 40/539 |
| 1,844,276 | A * | 2/1932 | Einson | G09F 1/08 40/539 |
| 1,892,194 | A * | 12/1932 | Taylor | A47F 5/112 40/539 |
| 2,085,097 | A * | 6/1937 | Hansen | A47F 11/02 40/584 |
| 2,100,403 | A * | 11/1937 | Mancuso | G09F 1/08 40/539 |
| 2,125,111 | A * | 7/1938 | Horr | G09F 1/06 40/610 |

(Continued)

*Primary Examiner* — Gary C Hoge
(74) *Attorney, Agent, or Firm* — McCracken & Gillen LLC

(57) ABSTRACT

A display system and a method of forming a display are disclosed. A beam is formed from a first substantially flat substrate, a sidewall is formed from a second substantially flat substrate, and a panel is formed from a third substantially flat substrate. The beam includes a first slot, the sidewall is joined to an end of the beam and includes a second slot, and the panel includes an interior portion and first and second tabs extending outwardly from the interior portion. The first tab is inserted into the first slot and the second tab is inserted into the second slot to secure the panel to the beam and the sidewall.

25 Claims, 14 Drawing Sheets

(56) References Cited

U.S. PATENT DOCUMENTS

| | | | | | |
|---|---|---|---|---|---|
| 2,144,594 | A | * | 1/1939 | Katz | G09F 1/04 |
| | | | | | 40/788 |
| 2,385,002 | A | * | 9/1945 | Jorgenson | G09F 1/06 |
| | | | | | 40/603 |
| 2,824,395 | A | * | 2/1958 | Decker | G09F 1/06 |
| | | | | | 40/605 |
| 3,322,382 | A | * | 5/1967 | Rohrbach | A47F 5/112 |
| | | | | | 211/195 |
| 3,470,641 | A | * | 10/1969 | Meyer | G09F 1/04 |
| | | | | | 40/607.1 |
| 3,508,734 | A | * | 4/1970 | An Der Eiche | G09F 15/0068 |
| | | | | | 248/459 |
| 3,999,662 | A | * | 12/1976 | Barnhardt | A47F 5/112 |
| | | | | | 229/120.36 |
| 4,266,355 | A | * | 5/1981 | Moss | G09F 1/06 |
| | | | | | 40/539 |
| 4,302,897 | A | * | 12/1981 | Deckys | G09F 1/06 |
| | | | | | 40/605 |
| 5,050,326 | A | * | 9/1991 | Munsey | G09F 23/06 |
| | | | | | 40/538 |
| 5,513,455 | A | * | 5/1996 | Walker | G09F 1/06 |
| | | | | | 40/788 |
| 5,662,508 | A | * | 9/1997 | Smith | A63H 33/08 |
| | | | | | 493/137 |
| 2008/0067301 | A1 | * | 3/2008 | Moss | A47F 5/112 |
| | | | | | 248/174 |
| 2013/0330998 | A1 | * | 12/2013 | Fox | A63H 33/04 |
| | | | | | 446/124 |

* cited by examiner

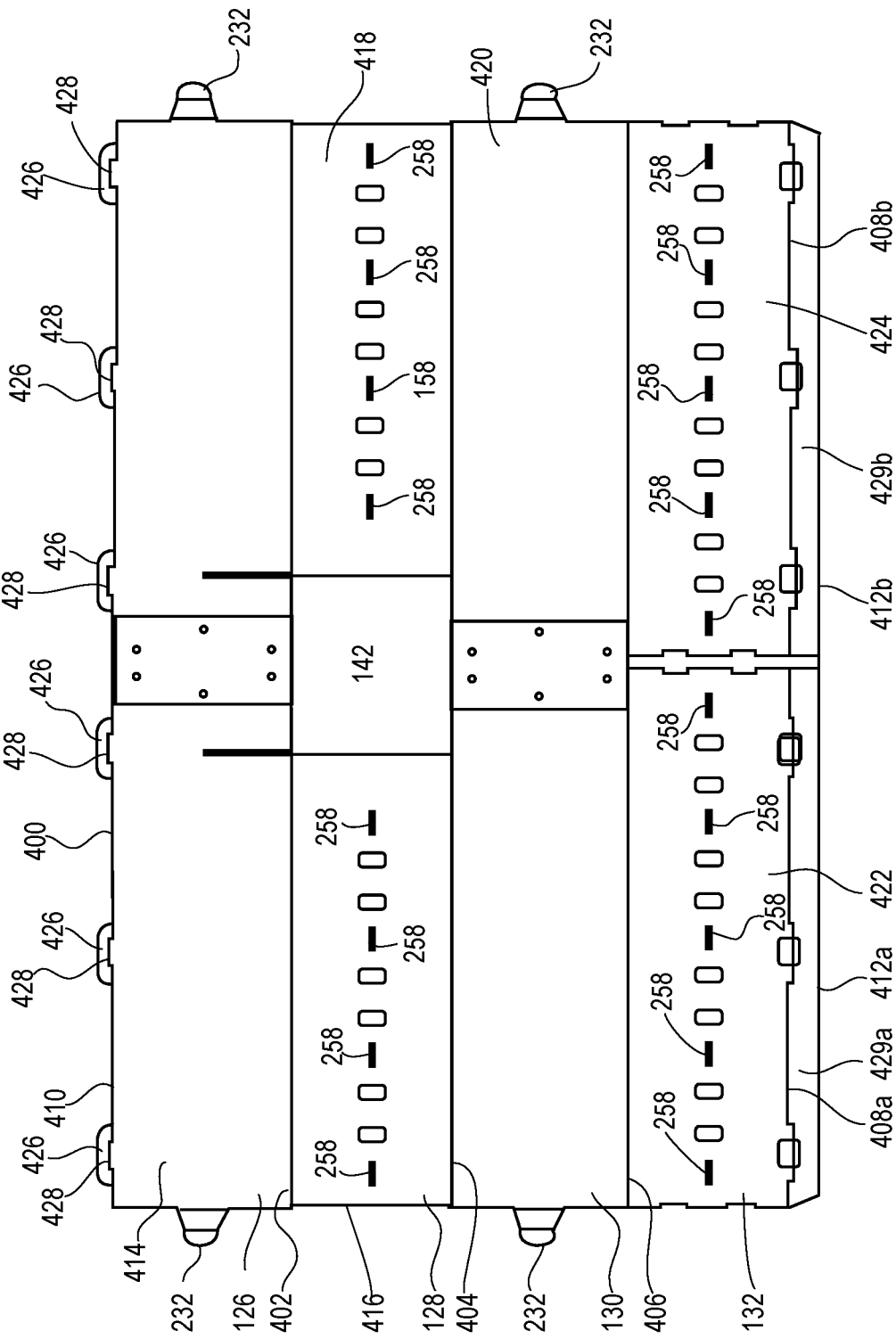

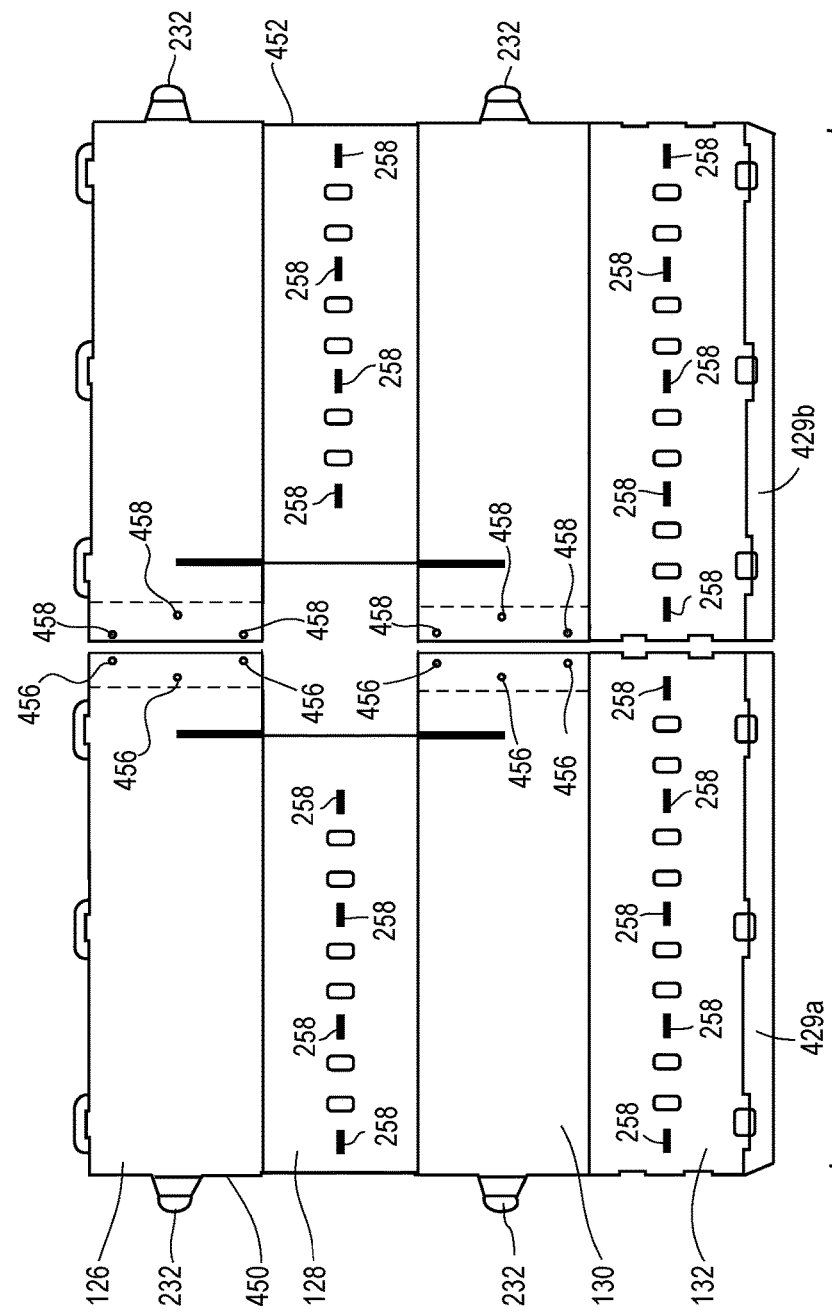

DISPLAY AND METHOD OF CONSTRUCTING SAME

CROSS-REFERENCE TO RELATED APPLICATIONS

The present application claims benefit of Bonifas, U.S. Provisional Patent Application No. 62/712,731, filed Jul. 31, 2018, and entitled "Display and Method of Constructing Same." The entire contents of this application are incorporated herein by reference.

FIELD OF DISCLOSURE

The present subject matter relates to displays, and more particularly, to a display that has an appearance of a wall or other structure of cartons stacked one atop another.

BACKGROUND

In a retail establishment or at a promotional or other event, cartons of a product, for example, a beverage, may be stacked atop one another to form a structure such as a wall of cartons. Because the exteriors of the cartons are typically imprinted with marketing information associated with product, if the structure is sufficiently large, the structure may provide a striking display that promotes and advertises the product. Also, it has been found that when the cartons are of different colors and/or shapes, the cartons may be arranged to create a design that can convey a message or other indication, such as a holiday greeting or image, a sport-themed image, a logo, another promotional icon or image, or the like. Typically, arranging the cartons to create such a design is in the province of the stocking person, who either is employed by the retailer or other establishment or the personnel that deliver the cartons of product to the retailer or other establishment. The person may be quite skilled in arranging cartons to achieve a desired effect or may have limited skills in such regard. In any event, there may be no methodology in place to ensure uniformity in arrangement for establishment to establishment, and hence, messaging for the consumer may be undertaken inconsistently, thereby leading to inefficient sales promotion.

Further, the cartons that are stacked to form the structure contain the product. This fact works against the purpose of arranging the cartons to create the design in the first place, inasmuch as the design is disassembled as the product is sold, thereby reducing the promotion effectiveness.

SUMMARY

According to one aspect, a display system includes a beam formed from a first substantially flat substrate, a sidewall formed from a second substantially flat substrate and joined to an end of the beam, and a panel formed from a third substantially flat substrate. The beam includes a first slot, the sidewall includes a second slot, and the panel includes an interior portion and first and second tabs extending outwardly from the interior portion. The first tab is inserted into the first slot and the second tab is inserted into the second slot to secure the panel to the beam and the sidewall.

According to another aspect, a method of assembling a display includes the steps of folding a first substantially flat substrate to form a beam, forming a sidewall from a second substantially flat substrate, and forming a panel from a third substantially flat substrate. The method includes the additional steps of joining the sidewall to an end of the beam and securing the panel to the beam and the sidewall by inserting a first tab of the panel into a first slot disposed in the beam and a second tab of the panel into a second slot disposed in the sidewall.

Other aspects and advantages will become apparent upon consideration of the following detailed description and the attached drawings wherein like numerals designate like structures throughout the specification.

BRIEF DESCRIPTION OF THE DRAWINGS

FIG. 15 is an elevational view of a substrate that forms the beam of FIG. 8;

FIG. 16 is an elevational view of substrate sections that form the substrate of FIG. 15; and FIG. 16a is an elevational view of a securing panel that is used to join the substrate sections of FIG. 16.

DETAILED DESCRIPTION

Figure 1:
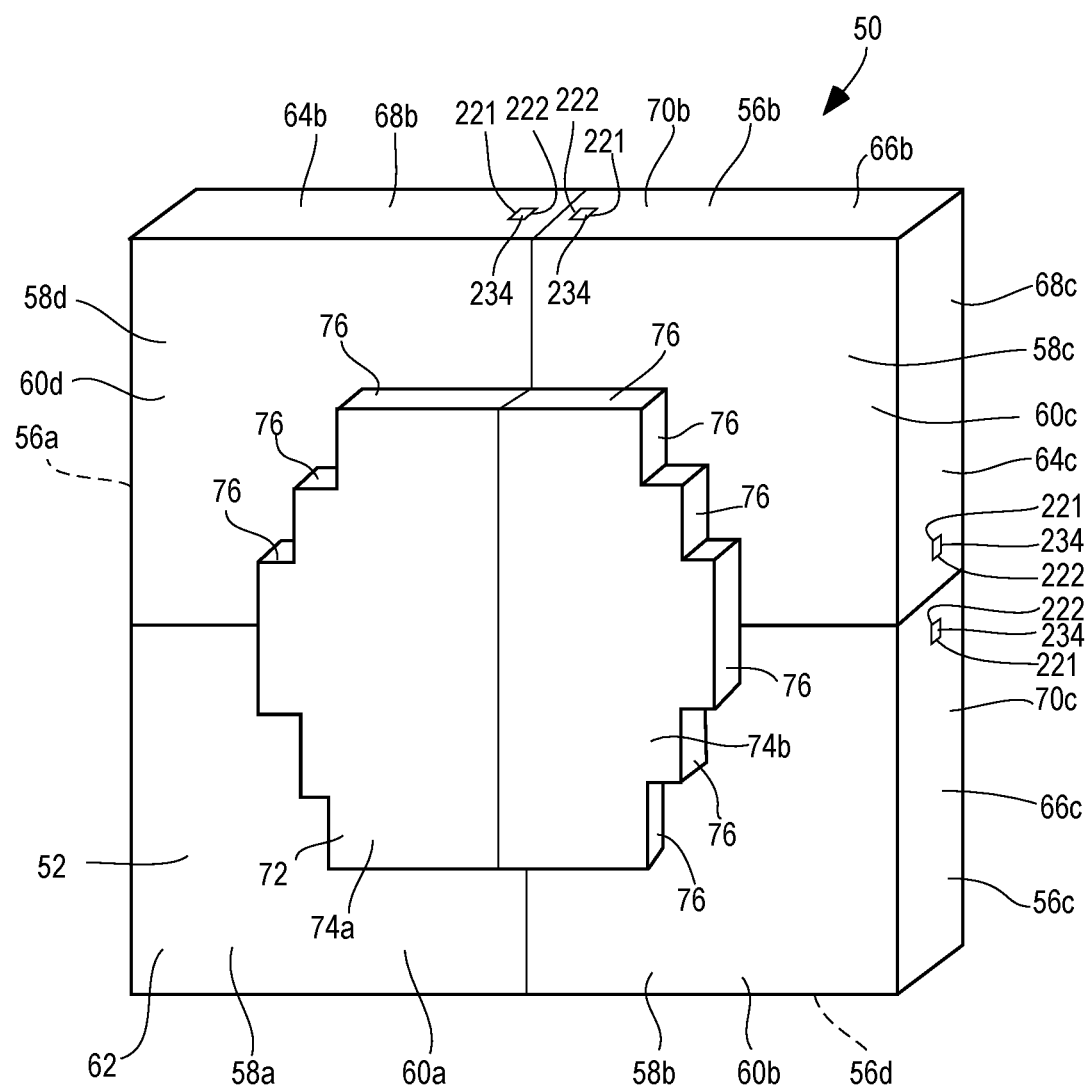
FIG. 1 is an isometric view of a front, top, and right side of a display.
Figure 2:
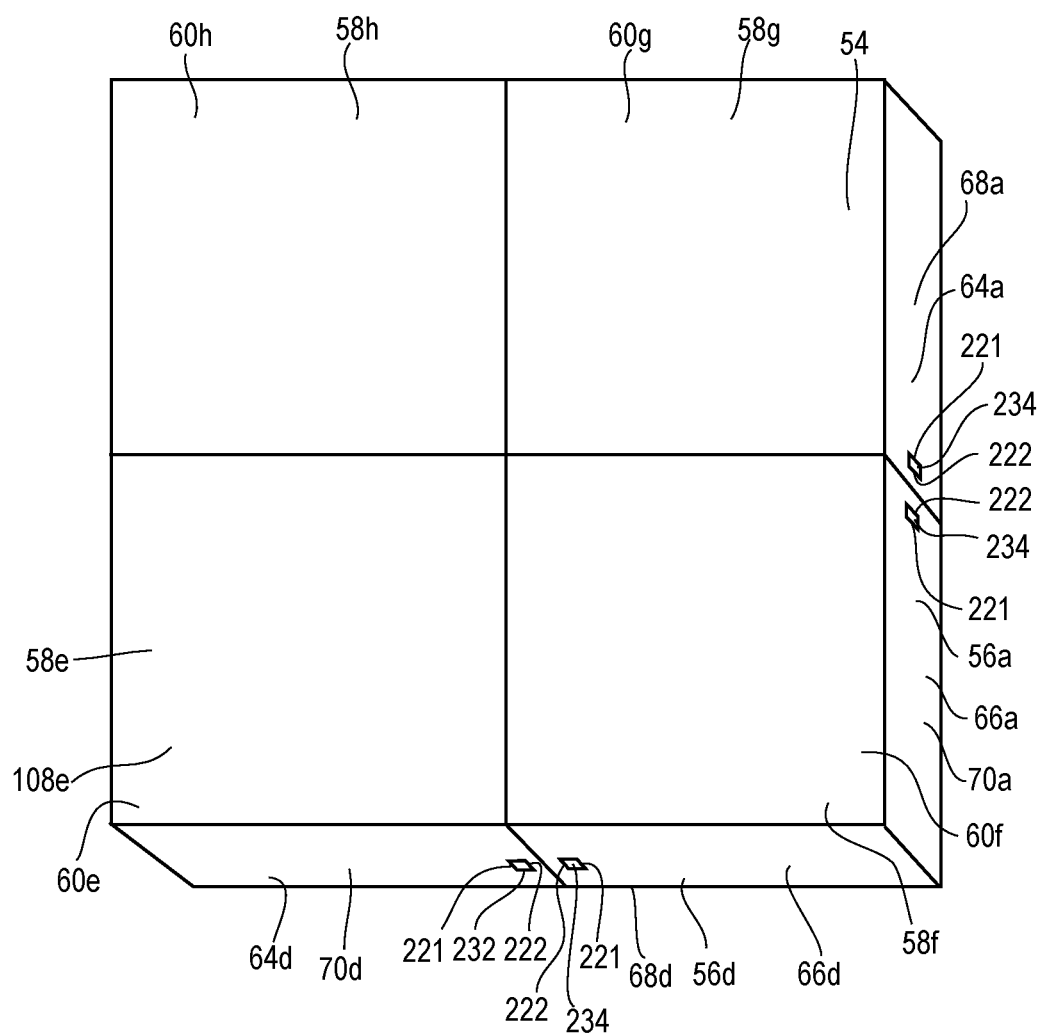
FIG. 2 is an isometric view of a rear, bottom, and left side of the display of FIG. 1.

Referring to FIGS. 1 and 2, a display 50 includes a first side 52 and a second side 54. The first side 52 and the second side 54 are disposed opposite one another and separated by sidewalls 56a, 56b, 56c, and 56d. In use, the display 50 rests on one of the sidewalls 56, for example, the sidewall 56d as shown in FIGS. 1 and 2. In some embodiments, the display 50 is sufficiently stable to be freestanding. In other embodiments, the display 50 may be supported by a wall or post (not shown) by positioning the display 50 such that one of the first side 52 or the second side 54 rests against and/or is secured to the wall or post. In some cases, ropes or tie-wires may be used to secure the display 50 to another structure for stability. It should be apparent that other ways of stabilizing and/or securing the display 50 may be used.

The first side 52 and the second side 54 are formed from a plurality of panels 58a, 58b, . . . , and 58h, secured to the sidewalls 56, as described below. Although the display 50 shown in FIGS. 1 and 2 includes eight rectangular panels 58a, 58b, . . . , and 58h, it should be apparent that the display 50 may include more or fewer such panels 58. In some embodiments, all of the panels 58a, 58b, . . . , and 58h have identical dimensions and shapes. In other embodiments, one or more of the panels 58a, 58b, . . . , and 58h may vary in dimension(s) and/or shape relative to the other panels 58.

Each panel 58 includes an outward facing surface 60. In some embodiments, each such surface 60 that comprises a side 52 or 54 of the display may be imprinted with a portion of an advertisement 62 so that when such surfaces 60 are disposed adjacent one another, the portions imprinted on the surfaces 60 form a partial or complete image. In some embodiments, these surfaces 60 may be imprinted with images that when disposed adjacent to one another to form the side 52 or 54, the images combine to create an illusion that the side 52 or 54 is formed from a plurality of packages (or cartons) stacked atop and/or adjacent one another.

Each sidewall 56a-56d is formed from a first sidewall section 64a-64d and a second sidewall section 66a-66d, respectively, secured to one another. Each first sidewall section 64a-64d includes an outward facing surface 68a-68d, respectively, and each second sidewall section 66a-66d includes an outward facing surface 70a-70d, respectively. Like the surfaces 60, the surfaces 68,70 may imprinted with an advertisement or images to provide an illusion that such surface 68,70 is formed from packages stacked atop and/or adjacent one another. It should be apparent that each sidewall 56 may instead comprise a single unit rather than being formed from first and second sidewall sections 64 and 66. Alternatively, in some embodiments, each sidewall 56 may be formed by securing together more than two sections. The display 50 may have different types of sidewalls 56 and each sidewall 56 may be formed from a single unit, two sidewall sections 64 and 66, or more than two sidewall sections.

In some embodiments, one or more projecting element(s) 72 may be secured to one or both of the first side 52 and/or the second side 54 of the display 50. For example, as shown in FIG. 1, the projecting element 72 is secured to the first side 52 and projects outwardly therefrom. Each projecting element 72 includes one or more exterior surfaces 74, for example, exterior surfaces 74a and 74b, and one or more sidewalls 76. In some embodiments, one or more of the sidewall(s) 76 of the projecting element 72 is/are secured to one or more panel(s) 58. The exterior surface 74 and sidewalls 76 of the projecting element 72 may be imprinted with an image. In some cases, when the exterior surfaces 74 of multiple projecting elements 72 are disposed adjacent to one another, the images printed on such surfaces 74 combine to form a partial or complete image. In some embodiments, the images printed on the exterior surface(s) 74 and sidewalls 76 of the projecting element(s) 72 provide an illusion that the projecting element(s) 72 is/are formed by portions of packages extending outwardly from the side 52 or 54 of the display 50 to which such projecting element(s) 72 is/are secured.

Figure 3:
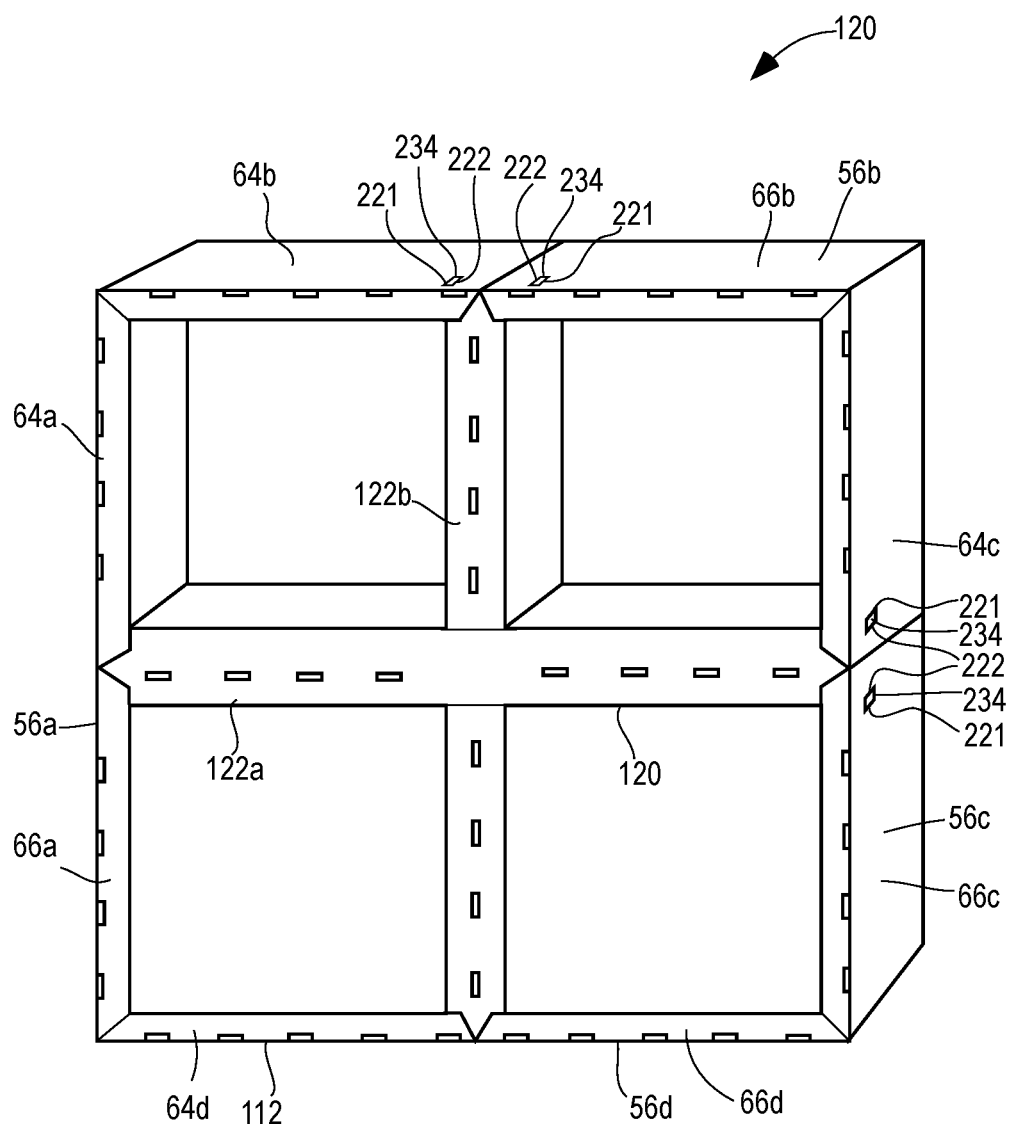
FIG. 3 is an isometric view of a frame structure of the display of FIG. 1.
Figure 4:
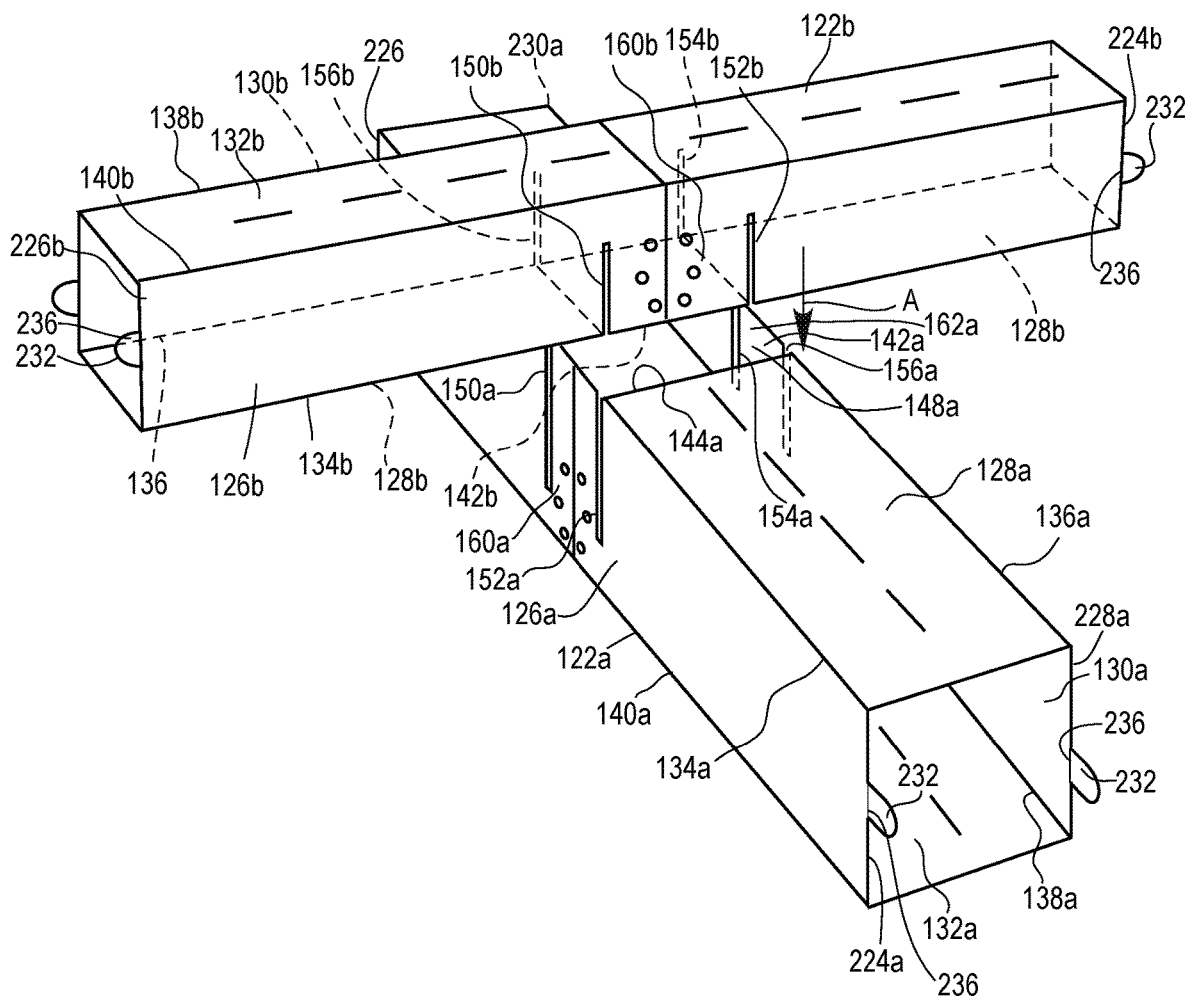
FIG. 4 is an isometric view of beams that comprise the frame structure of FIG. 3.
Figure 5:
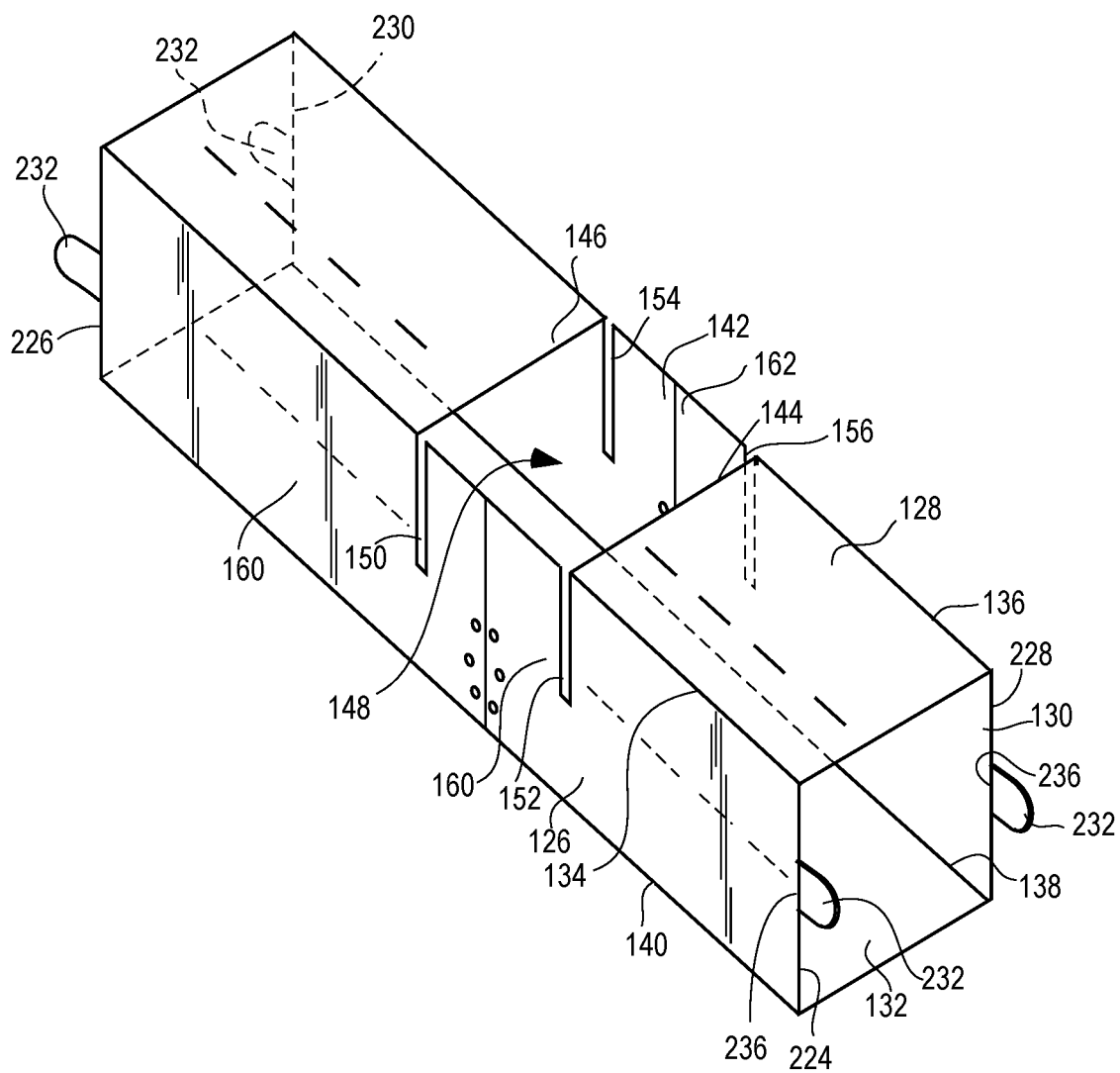
FIG. 5 is an isometric view of one of the beams of FIG. 4.

Referring also to FIGS. 3-5, the panels 58 and the sidewall sections 64,66 that comprise the display 50 are removably secured to and supported by a frame structure 120. The frame structure 120 includes substantially identical horizontal and vertical beams 122a and 122b secured to one another as described below. In some embodiments, the horizontal and vertical beams 122 may not be identical. In addition, the frame structure 120 may include additional beams (not shown), and the beams 122 or any additional beams that comprise the frame structure 120 may be disposed horizontally, vertically, or in any other orientation appropriate for supporting the panels 58 and sidewall sections 64,66.

As shown in FIGS. 4 and 5, each beam 122 is a hollow structure that has a rectangular or other quadrilateral and/or curved (e.g., circular or elliptical) shape in cross section. (It should be noted that FIG. 5 illustrates either of the beams 122a or 122b in the event that such beams are identical, and hence, the reference numerals used therein omit reference letters that would otherwise be associated with the reference numerals.) The illustrated beam 122a includes exterior walls 126a, 128a, 130a, and 132a and the illustrated beam 122b includes exterior walls 126b, 128b, 130b, and 132b. As seen specifically in FIG. 5, the exterior walls 126 and 130 of each beam 122 are disposed opposite one another with exterior walls 128 and 132 therebetween. In some embodiments, the beam 122 includes an edge 134 that spans the length of and is disposed between the walls 126 and 128, an edge 136 that spans the length of and is disposed between the walls 128 and 130, an edge 138 that spans the length of and is disposed between the walls 130 and 132, and an edge 140 that spans the length of and is disposed between the walls 132 and 126. Although the beams 122 shown in FIGS. 4-6 comprise four planar walls separated by four edges each, it should be apparent that the frame structure 120 may include beams that have more or fewer than four walls and edges, and in some cases and as indicated above may even be cylindrical (i.e., have no planar faces and edges).

Referring again to FIG. 4, a cutout 142a is formed in the wall 128a of the beam 122a that extends from the edge 134a and to the edge 136a. Further, transverse edges 144a and 146a of the cutout 142a span the distance between the edges 134a and 136a. The cutout 142a forms an opening 148a that exposes an interior of the beam 122a. Referring also to FIG. 5, in similar fashion, a cutout 142b is formed in the wall 128b of the beam 122b that extends between the edges 134b and 136b and includes transverse edges 144b and 146b. While cutouts 142a and 142b in each beam 122a, 122b are shown, it should be noted that both cutouts are not strictly necessary, inasmuch as only one of the beams 122a, 122b may have a cutout, if desired.

In some embodiments, each cutout 142 is substantially rectangular and is centered along the length of the beam 122. As should be apparent, the beam 122 may include one or more cutout(s) 142, either on the wall 128 or other walls. Further, the cutout(s) 142 may be disposed anywhere along the length of the beam 122 and may have non-rectangular, or even non-polygonal shapes. Preferably, the shape(s) of the cutout(s) 142 correspond to the shapes of the beam 122 in which such cutout 142 is disposed, although this need not be the case.

Substantially parallel slits 150 and 152 are formed in the wall 126 at the intersections of the edge 134 and the edges 144 and 146, respectively, and extend toward the edge 140. Similarly, substantially parallel slits 154 and 156 are formed in the wall 130 at the intersections of edge 136 and the edges 144 and 146, respectively, and extend toward the edge 138. In some embodiments, the slits 150 and 152 are substantially perpendicular to the edge 134 and the slits 154 and 156 are substantially perpendicular to the edge 136.

The cutout 142 and the slits 150-156 facilitate joining of two beams 122 with one another. For example, as shown in FIG. 4, to join the beams 122a and 122b, the cutout 142a of the beam 122a is aligned with the cutout 142b of the beam 122b such that the edge 144a of the cutout 142a is aligned with the edge 134b of the beam 122b. Further, the slits 150a, 152a, 154a, 156a are aligned with the slits 156b, 152b, 154b, 150b respectively and 152b.

After the cutouts 142 and the slits 150-156 are aligned in this manner, the beams 122a, 122b are urged toward one another. For example, the beam 122b may be urged toward the beam 122a along the direction A (FIG. 4). Doing so causes the slits 150b, 152b, 154b, 156b to slide into the slits 156a, 152a, 154a, 150a, respectively, and thereafter the surfaces defining the slits 152, 156, 158, 150 move into engagement with portions of the walls 126, 130 that are disposed beyond the ends of the slits 150, 152, 156, and 158. In a preferred embodiment, the lengths of the slits 150-156 are such that the beams 122a and 122b nest against one another with the walls 128a and 132b and walls 132a and 128b substantially coplanar with one another (ignoring the thicknesses of the walls), although this need not always be the case. Frictional forces between surfaces defining the slits 150a, 152a, 154a, and 156a and the slits 156b, 152b and 154b, 150a and adjacent portions of the walls 126, 130 facilitate holding the two beams 122a and 122b together. Further one or both of the cutouts 142a and 142b (if both are provided) facilitate joining beams 122a and 122b by allowing the portions 160a and 162a of the walls 126a and 130a, respectively, to slide into the cutout 142b, and the portions 160b and 162b of the walls 126b and 130b, respectively, to slide into the cutout 142a. It should be evident to one of ordinary skill that one need not provide both cutouts 142a, 142b so long as the slits 150, 152 are joined by perpendicular slits in the wall 128 inasmuch as only one of the cutouts allows assembly of the beams as described above.

Figure 6:
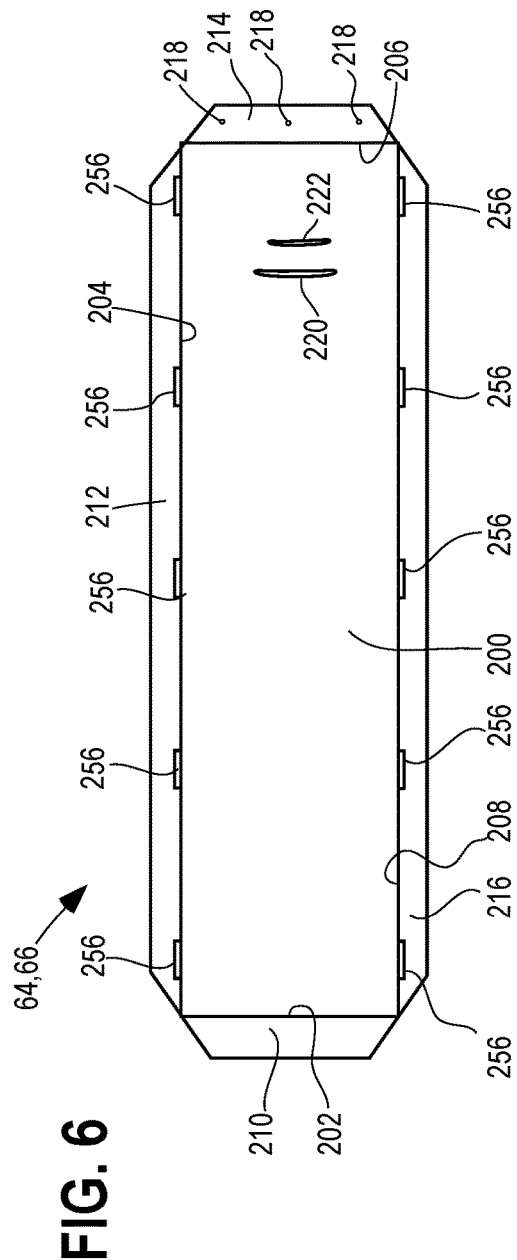
FIG. 6 is an elevational view of a portion of a sidewall of the display of FIG. 1.
Figure 7:
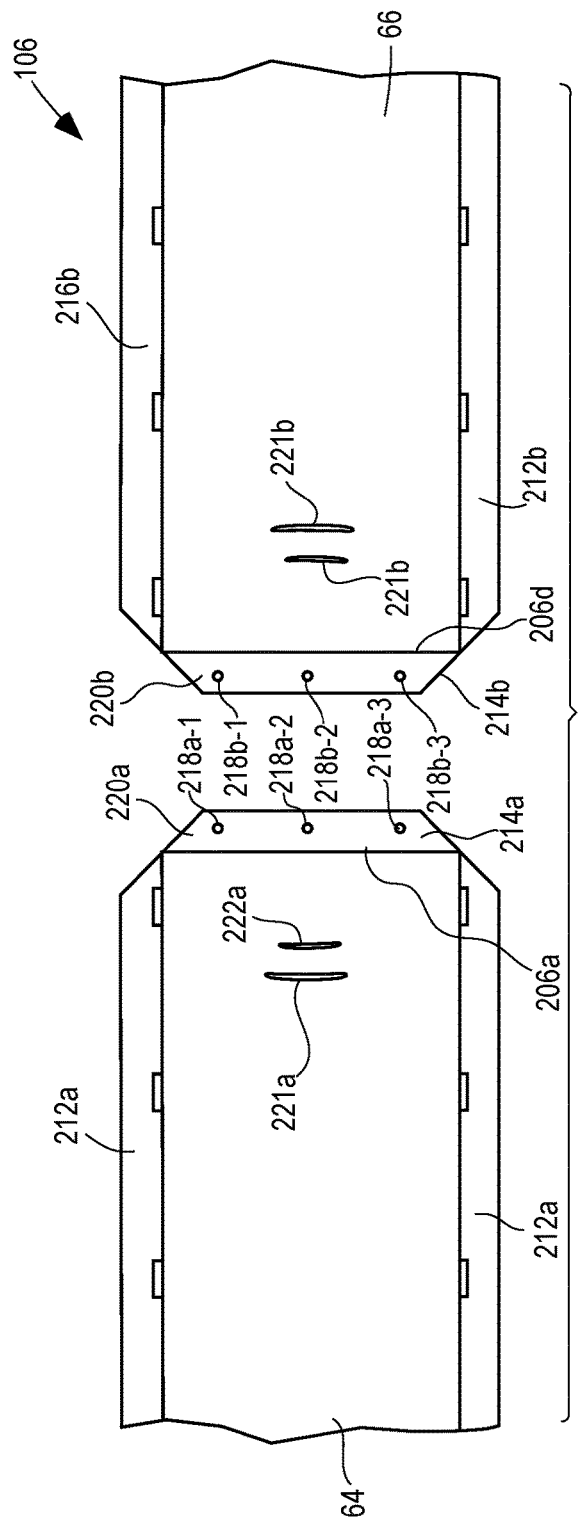
FIG. 7 is an elevational view of two sidewall sections that form a sidewall of the display of FIG. 1.
Figure 7A:
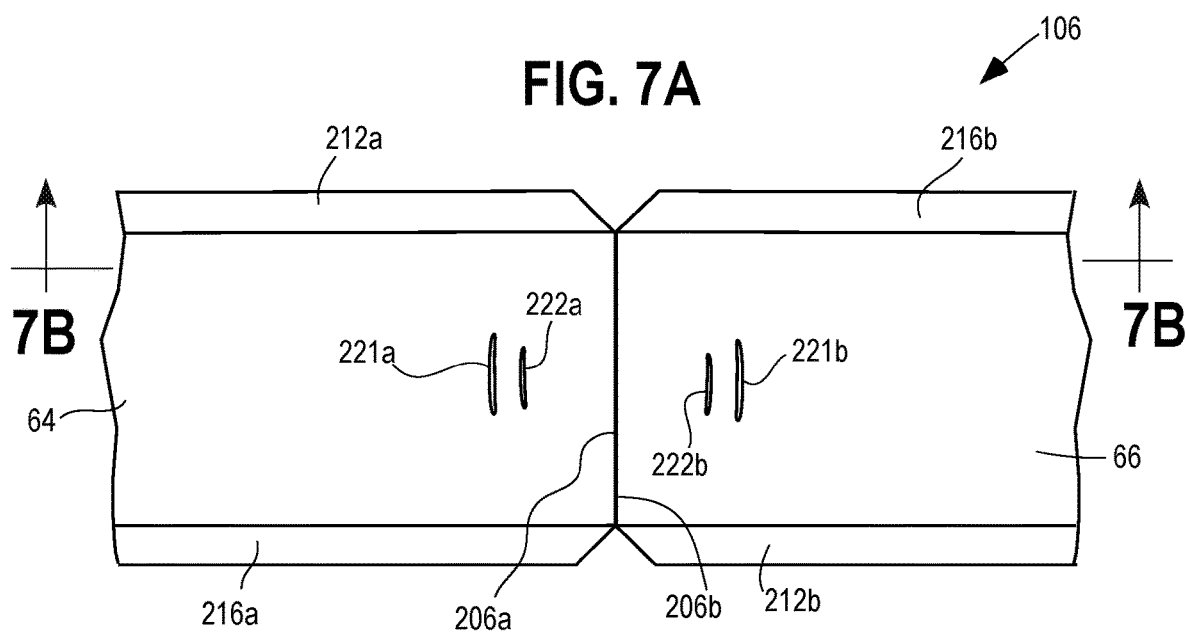
FIG. 7A is an elevational view of the two sidewall sections 7 joined together to form a sidewall of the display of FIG. 1.

If the sidewall 56 comprises separate sidewall sections 64 and 66, the sidewall 56 is preferably formed by securing such sidewall sections 64 and 66 to one another. In some embodiments, the sidewall sections 64 and 66 are substantially identical. In other embodiments, the sidewall sections 64 and 66 may be different. Referring to FIGS. 1-3, 6, 7, 7A and 7B, the illustrated sidewall sections are mirror images of one another. Each side wall section 64, 66 is substantially planar and includes a substantially rectangular interior portion 200 (FIGS. 6 and 7) defined by lines of weakness 202, 204, 206, and 208 (FIGS. 6 and 7). The lines of weakness 202 and 206 are substantially parallel, disposed at opposite ends of the sidewall sections 64 and 66, and separated by the lines of weakness 204 and 208. Similarly, the lines of weakness 204 and 208 are substantially parallel, disposed at opposite ends of the sidewall sections 64 and 66, and separated by the lines of weakness 202 and 206. Tab portions 210, 212, 214, and 216, extend outwardly away from the interior portion 200 and are coupled thereto by the lines of weakness 202, 204, 206, and 208, respectively. In some embodiments, the tab portions 210, 212, 214, and 216 are trapezoidal. However, it should be apparent to one having ordinary skill in the art that such tab portions may be any other shape. The tab portion 214 includes one or more openings 218. (The elements 200-218 are used hereafter in FIGS. 7, 7A, 7B, and 8 together with letter suffixes a and b that are associated with different sidewall sections 64 and 66, respectively).

Figure 7B:
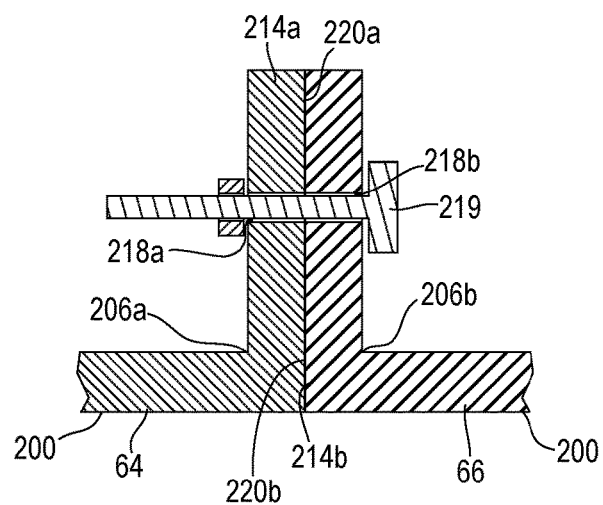
FIG. 7B is a cross-sectional view taken generally along the lines 7B-7B of FIG. 7A.

The sections 64 and 66 are positioned so that the tab portions 214a, 214b thereof face one another. The tab portions 214a and 214b are bent downwardly as seen in FIG. 7 (upwardly as shown in FIG. 7B) along the lines of weakness 206a and 206b so that a face 220a of the tab portion 214a of the sidewall section 64 can be aligned and brought into contact with a face 220b of the tab portion 214b of the sidewall section 66. The faces 220a and 220b are aligned such that the openings 218a-1, 218a-2, and 218a-3 disposed in the tab portion 214a are aligned with the openings 218b-1, 218b-2, and 218b-3, respectively, of the tab portion 214b. Thereafter, one or more fasteners 219 such as a bolt and screw, a zip tie, and/or any other appropriate fastener apparent to one having ordinary skill in the art may be passed through the aligned openings 218a-1 through 218a-3 and 218b-1 through 218b-3, respectively, and secured. Securing one or more fasteners in this manner joins the sidewall sections 64 and 66 to one another and forms the sidewall 56. It should be apparent that staples, hook and loop fasteners, adhesives, and other ways of securing may be used to join the sections 64 and 66.

Referring to FIGS. 7, 7A, 7B, and 8, the interior portion 200 of each sidewall section 64 and 66 includes a first slot 221 and a second slot 222. In some embodiments, the first slot 221 is larger (i.e., longer in the up and down dimension of FIG. 8) than the second slot 222. In other embodiments, the first slot 221 and the second slot 222 have identical dimensions.

Further, the wall 126 of the beam 122 includes opposite outside edges 224 and 226 (see FIG. 5) disposed between the edges 134 and 140. Similarly, the wall 130 includes opposite outside edges 228 and 230 (see FIG. 5) disposed between the edges 136 and 138. Each of the edges 224, 226, 228, and 230 includes a tab 232 extending outwardly therefrom. Each tab 232 is joined to the edge 224, 226, 228, and 230 by a first line of weakness 236.

Figure 8:
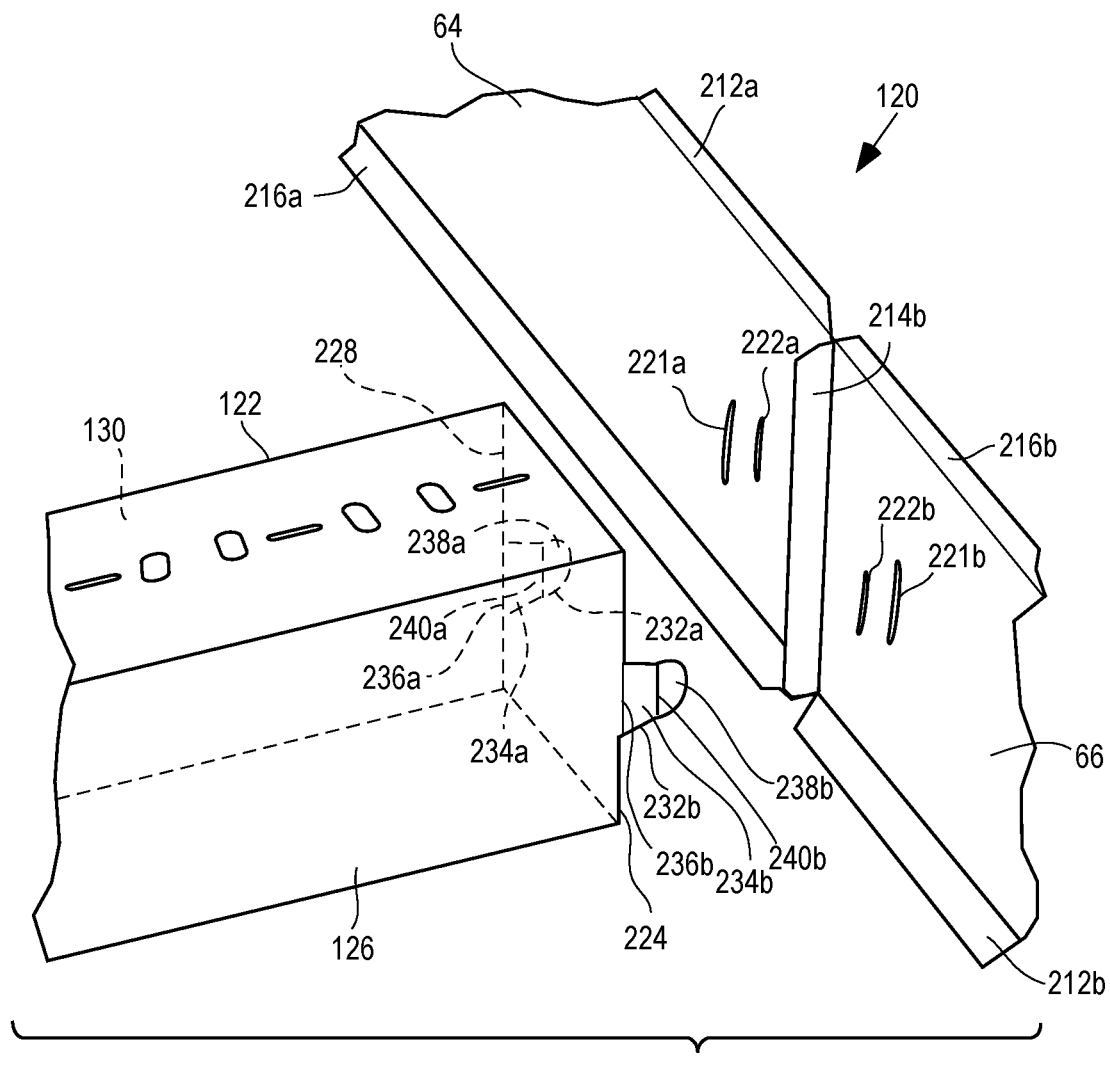
FIG. 8 is an exploded, fragmentary, isometric view of a beam of the display of FIG. 5 being joined to the sidewall of the display of FIG. 1 (need figure designation adjacent braces)

In some embodiments, for example, as seen in FIG. 8, the tab 232 includes a first section 234 that extends outwardly from the first line of weakness 236, and a second section 238 joined to the first section 234 by a second line of weakness 240. (The elements 232-238 are used hereafter in FIG. 8 together with letter suffixes a and b that are associated with different sidewall edges 224 and 228, respectively). Referring to FIGS. 3 and 8, to secure the beam 122a to the sidewall 56a, the tab 232a extending from the edge 228 of the beam 122a is passed through the slot 221a in a first direction until the first line of weakness 236a just reaches or passes through such slot 221a. The tab 232a is folded at a 90-degree angle along the first line of weakness 236a in a direction toward the slot 222a. Thereafter, the tab 232a is folded along the second line of weakness 240a and the second section 238a of the tab 232a is passed through the slot 222a in a second direction opposite the first direction. The tab 232b is folded and passed through the slots 221b and 222b in a substantially identical manner. Passing the tabs 232a and 232b through the slots 221a/222a and the slots 221b/222b, respectively, secures the beam 122a to the sidewall 56a.

If the sidewall 56a comprises the first and second sidewall sections 64 and 66, passing the tab 232a through the slots 221a and 222a as described above secures the beam 122a to the first sidewall section 64 of the sidewall 56a, and passing the tab 232b through the slots 221b and 222b secures the beam 122a to the second sidewall section 66. The beam 122a is secured to the sidewall 56c (opposite the sidewall 56a, see FIG. 3) by securing the tabs 232 that extend outwardly from the edges 226 and 230 as described above. Similarly, the beam 122b is secured to the sidewalls 56b and 56d in a substantially identical fashion. Securing the beam 122*a* to the sidewalls 56*a* and 56*c* and the beam 122*b* to the sidewalls 56*b* and 56*d* creates the frame structure 120 (FIG. 3).

Figure 9:
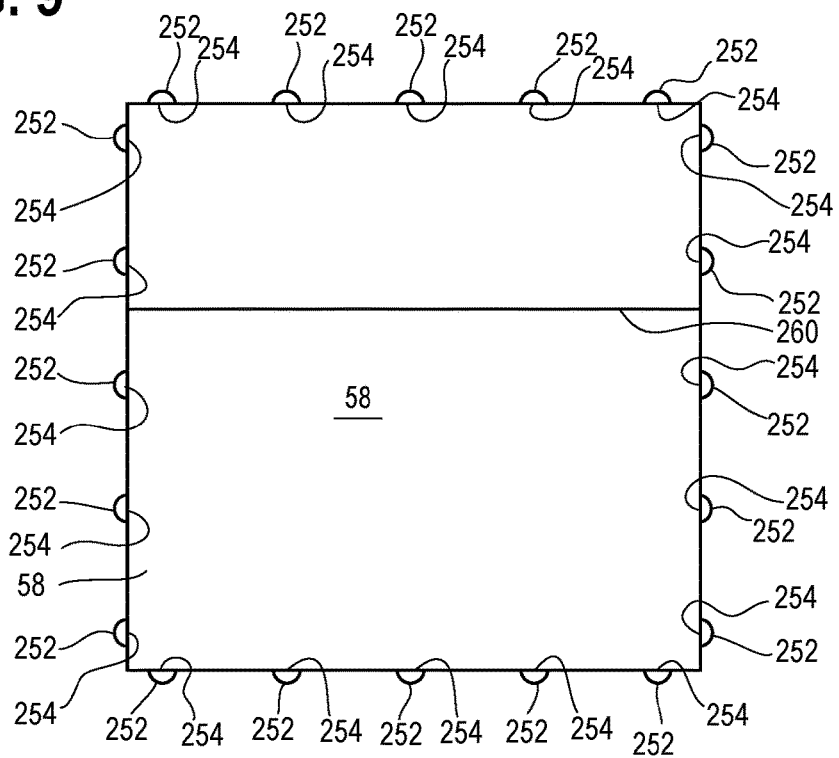
FIG. 9 is elevational view of panel of the display of FIG. 1.
Figure 10:
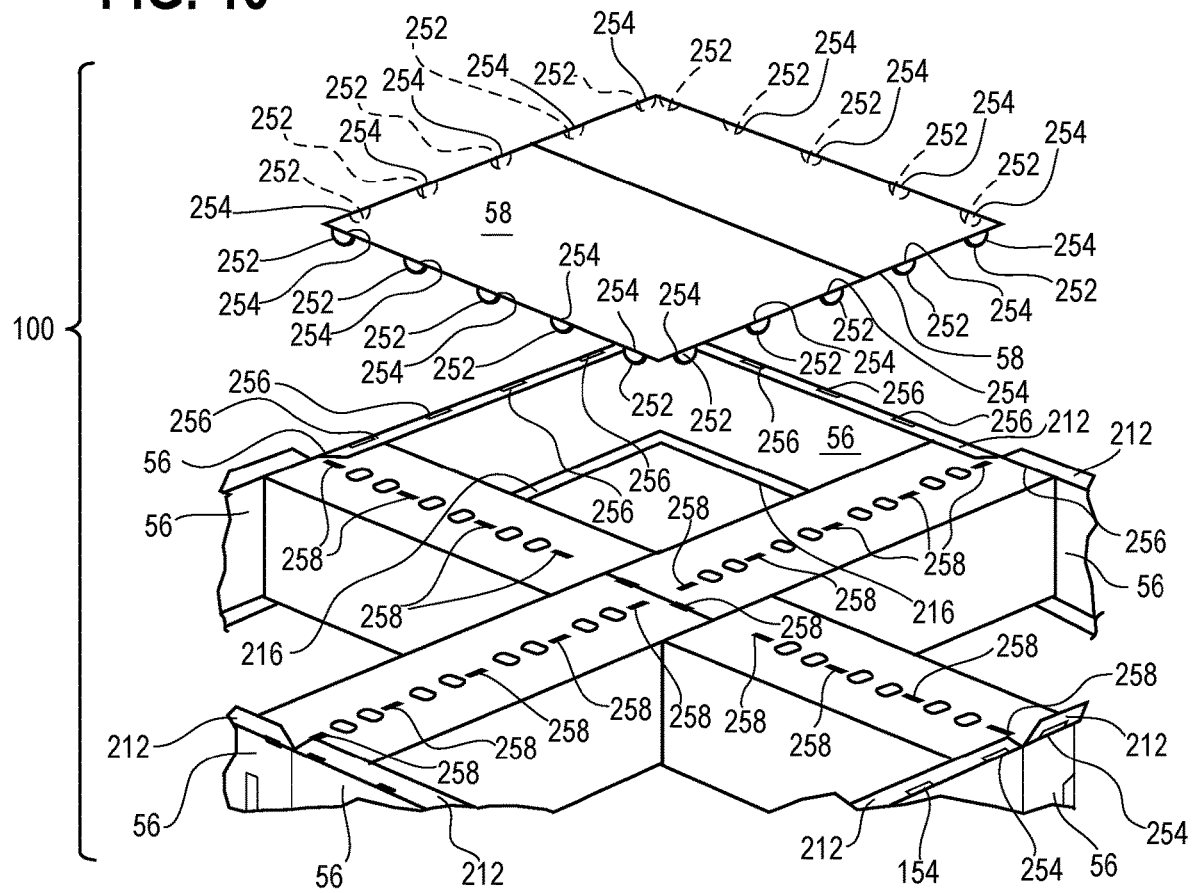
FIG. 10 is an exploded, fragmentary, isometric view of the panel of FIG. 9 being joined to the beam of FIG. 5 to assemble the display of FIG. 1.

Referring to FIGS. 1, 2, and 6-10, after the frame structure 120 is constructed as described above, the panels 58 may be secured thereto. In particular, as seen in FIGS. 9 and 10, each panel 58 comprises an interior portion 250, a plurality of tabs 252 extending outwardly from the interior portion 250, and a line of weakness 254 disposed between each tab 252 and the interior portion 250.

Referring specifically to FIG. 6, disposed along the lines of weakness 204 and 208 that span the lengths of the sections 64,66 are a plurality of slots 256 that extend through the lines of weakness 204 and 208.

Similarly, as shown in FIGS. 5 and 10, the exterior walls 128 and 132 of the beams 122 have a plurality of slots 258 disposed thereon and extending therethrough.

The panel 58 may be secured to the frame structure 120 to form the first side 52 and the second side 54 of the display 50, each tab 252 of the panel 58 is folded away from the exterior surface 60 of the panel 58 along the line of weakness 254. Thereafter, each tab 252 is inserted into a corresponding slot 256 along the line of weakness 208 of the sidewall 56 or the tab 258 of one of the exterior walls 128 and 132 of the beams 122. All of the panels 58 are secured in this manner to create the first side 52 and the second side 54 of the display 50.

In some embodiments, the panel 58 may include a line of weakness 260, and the panel 58 may be folded along such line reduce the amount of space occupied by the panel 58 when not secured to the frame structure 120.

Figure 11:
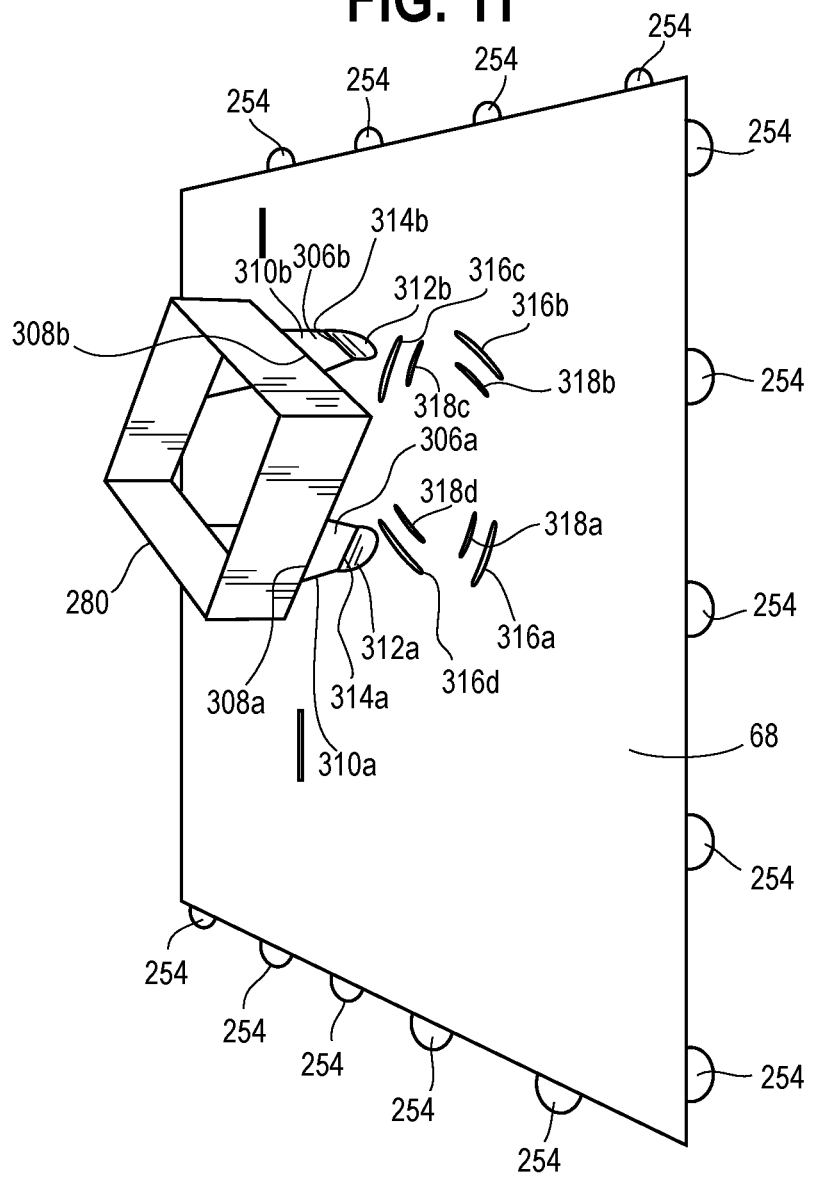
FIG. 11 is an exploded, fragmentary, isometric view of a projecting element support of the display of FIG. 1 being joined to a panel of FIG. 9.
Figure 12:
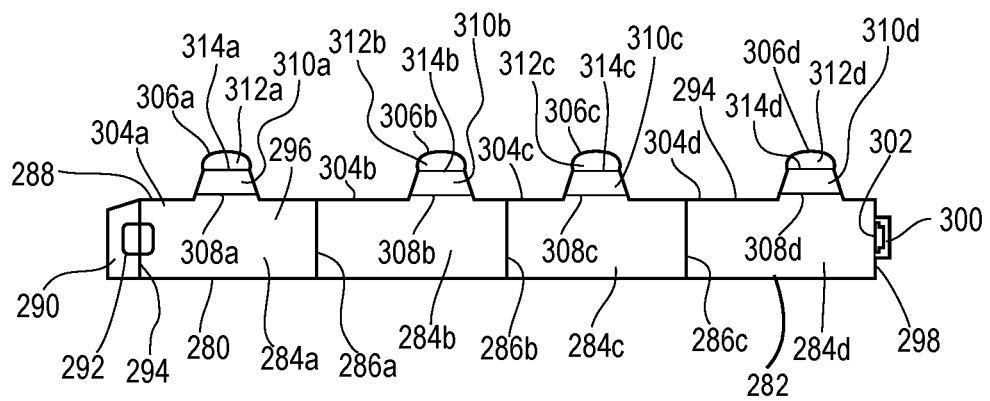
FIG. 12 is an elevational view of the projecting element support of FIG. 12.

Referring to FIGS. 1, 11 and 12 one or more projecting element support(s) 280 may be secured to the one or more panel(s) 58. The projecting element support 280 is formed from a substantially rectangular substrate 282 having four panels 284 separated by lines of weakness 286 (seen in FIG. 12). Extending from a first end 288 of the rectangular substrate 282 are a first tab 290 and a second tab 292. The first tab 290 and the second tab 292 are connected to the rectangular substrate 282 by a line of weakness 294. The second tab 292 is nested in the first tab 290 and the first tab 290 is capable of individual movement independent of the second tab 292. The first tab 290 may thus be folded inwardly (i.e., into the page as seen in FIG. 12) away from an exterior surface 296 of the rectangular substrate 282 to cause only the second tab 292 to extend from the first end 288.

A third tab 300 is disposed at a second end 298 opposite the first end 288. A slot 302 is disposed between the third tab 300 and the fourth panel 284*d* of the rectangular substrate 282. The rectangular substrate 282 is folded along the lines of weakness 286 to form a rectangular structure and the second tab 292 is inserted into the slot 302 to form the projecting element support 280.

Each panel 284 comprises an edge 304 substantially perpendicular to the lines of weakness 286. Extending outward from each panel 284 along the edge 304 is a tab 306. Each tab 306 is coupled to a corresponding panel 284 by a line of weakness 308.

Further, each tab 306 includes a first portion 310 and a second portion 312 separated by a line of weakness 314. Corresponding to each tab 306 are a first slot 316 and a second slot 318 formed in the panel 58. The tab 306 is passed through the first slot 316, then folded along the line of weakness 308, folded along the line of weakness 314, and the second portion 312 of the tab 306 is passed through the second slot 318. Weaving the tab 306 through the first slot 316 and the second slot 318 facilitates securing the projecting element support 280 to the panel 58. It should be apparent that the projecting element support 280 may be secured to the panel 58 either before or after such panel is secured to the frame structure 120. In a preferred embodiment, the projecting element support 280 is secured to the panel 58 before the panel 58 is secured to the frame structure 120.

After the projecting element support 280 is secured to the panel 58 and the panel 58 is secured to the frame structure 120, the projecting element 72 may be constructed and secured to the panel 58.

Figure 13:
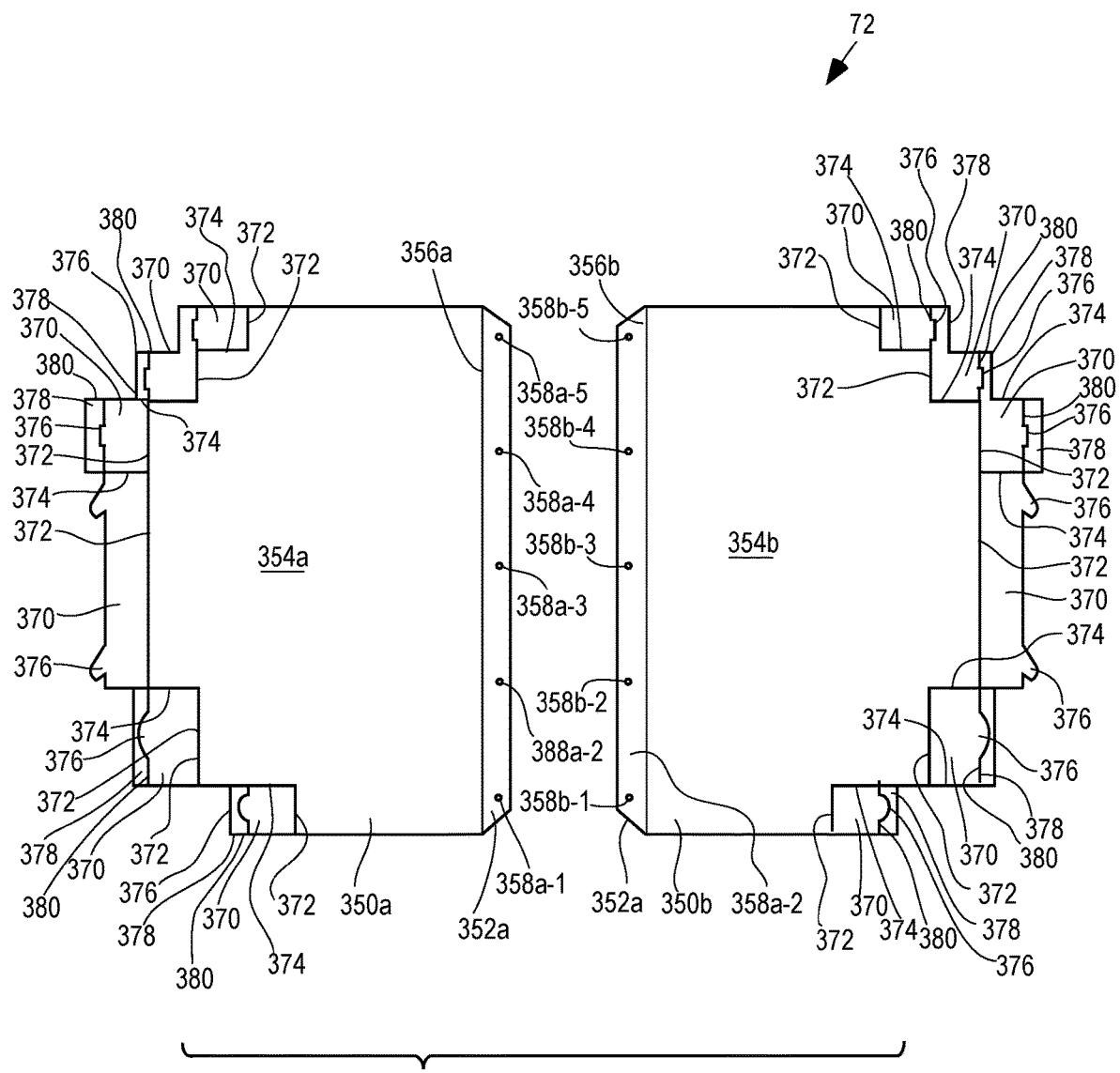
FIG. 13 is an elevational view of a projecting element of the display of FIG. 1 (need braces)

Referring to FIG. 13, in one embodiment, the projecting element 72 is constructed from one or more substantially flat projecting element panels 350. If more than one panel, for example, a first panel 350*a* and a second panel 350*b*, are used to construct the projecting element 72, then each such panel 350 includes a joining flap 352. Each joining flap 352 extends outwardly from an interior portion 354 of the panel 350 and is coupled to the interior portion 354 by a line of weakness 356. Each joining flap 352 includes one or more openings 358. Further, each opening 358 of a particular joining flap 352*a* of one panel 350*a* has a corresponding opening 358 disposed in another joining flap 352*b* of another panel 350*b*. For example, the openings 358*a*-358*e* of the joining flap 352*a* of the panel 350*a* have corresponding openings 358*f*-358*j*, respectively, of the joining flap 352*b* of the panel 350*b*.

Figure 14:
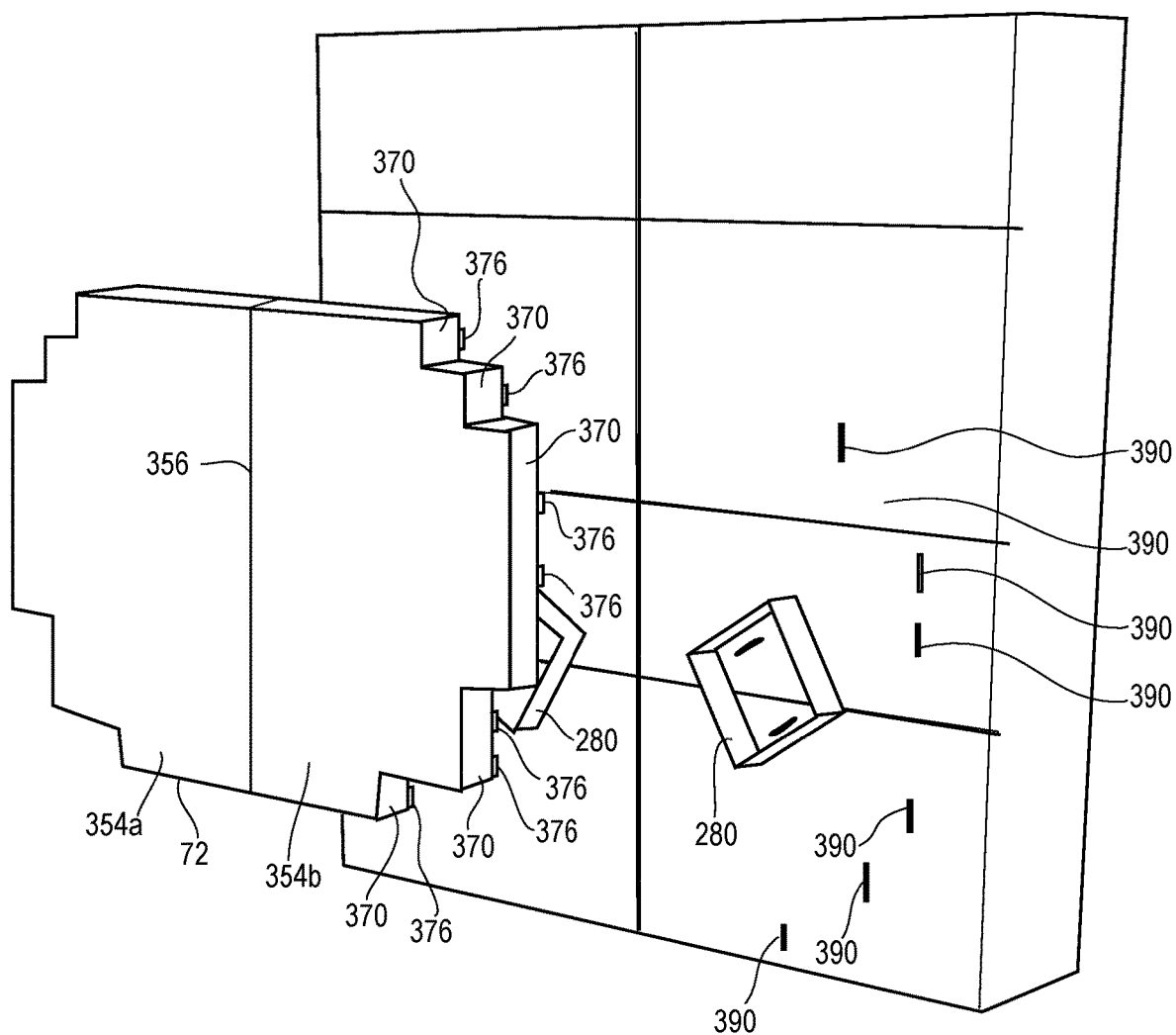
FIG. 14 is an exploded, fragmentary, isometric view of the projecting element of FIG. 13 being joined to the display of FIG. 1.

The first panel 350*a* and the second panel 350*b* together may be secured to one another by folding the joining flap 352*a* of the first panel 350*a* along the line of weakness 356*a*, folding the joining flap 352*b* of the second panel 350*b* along the line of weakness 356*b*, and bringing a face 358*a* of the folded joining flap 352*a* into contact with a face 358*b* of the folded joining flap 352*b* such that the openings 358*a*-1 through 358*a*6 of the joining flap 352*a* are aligned with the corresponding openings 358*b*-1 through 358*b*6, respectively. Thereafter, a fastener (not shown) such as a bolt and screw, a zip tie, and any other appropriate fastener apparent to one having ordinary skill in the art passed through the pair of openings 358*a* and 358*b* and secured. Although FIG. 14 shows two panels 354*a* and 354*b*, it should be apparent that any number of such panels may be joined together to form the projecting element 72. Further, as noted above, the projecting element 72 may comprise only substantially flat panel 350.

Each projecting element 72 includes one or more sidewall portions 370 extending outwardly from an interior portion 354 thereof, and each sidewall portion 370 is separated from the interior portion 354 by a line of weakness 372. At least one side of sidewall portion 370 is separated from the interior portion 354 and any adjacent sidewall portions 370 by a slit 374. Such slit 374 is substantially perpendicular to the line of weakness 372 that separates such sidewall portion 370 from the interior portion 354.

Each sidewall portion 370 includes one or more tab(s) 376. Further, some sidewall portions 374 may have a flap portion 378 that surrounds the tab 376 and is separated from the sidewall portion by a further line of weakness 380. For those sidewall portions 374 that include a flap portion 378, folding the flap portion 378 along the line of weakness 380 exposes the tab 376.

Referring to FIGS. 1, 2, 13, and 15, each panel 58 of the display 50 onto which the projecting element 72 may be installed includes a receiving slit 390 that corresponds to one of the tabs 376 disposed in one of the sidewall portions 370 of the projecting element 72. The projecting element 72 is positioned such that tabs 376 are aligned with the receiving slits 390 corresponding thereto, and the projecting element 72 is urged toward the panel 58. The receiving slits 390 frictionally hold the tabs 376 and thus secure the projecting element 72 on the display 50. Further, the projecting element support 280 provides a spacer between the panel(s) 58 of the display 50 and the panel(s) 354 of the projecting element 72.

Referring once again to FIGS. 5, 6, and 15, in some embodiments, each beam 122 is formed from a substantially flat substrate 400. The flat substrate 400 includes lines of weakness 402, 404, 406, and 408 that span a length thereof and are parallel to outside edges 410 and 412. The flat substrate 400 also includes a first panel 414, a second panel 416, a third panel 418, a fourth panel 420, a fifth panel 422, and a sixth panel 424. Further, the second panel 416 and the third panel 418 are separated by the cutout 142 and are both joined to the first panel 414 along the line of weakness 402. The second panel 416 and the third panel 418 are also joined to the fourth panel 420 along the line of weakness 404. The fourth panel 420 is joined to the fifth panel 422 and the sixth panel 424 along the line of weakness 406.

Disposed along the outside edge 410 are a plurality of flaps 426. Each flap surrounds a slit 428 disposed between the flap 426 and the first panel 414. Disposed between the fifth panel 422 and the outside edge 412a is a flap 429a and between the sixth panel 424 and the outside edge 412b is a flap 429b. The flap 429a is joined to the fifth panel 422 along the line of weakness 408a and the flap 429b is joined to the sixth panel 424 along the line of weakness 408b.

The flaps 428a and 428b are folded along the lines of weakness 408a and 408b, respectively, to expose the tabs 430. Each tab 430 corresponds to and is disposed opposite one of the slits 428.

The flat substrate 400 is folded along the lines of weakness 402, 404, and 406 to form a tube that comprises the beam 122. Thereafter, each tab 420 is inserted into the slit 428 corresponding thereto to maintain the tube shape. After folding, the first panel 414 forms the sidewall 126 of the beam 122, the second and third panels 416, 418 combine to form the sidewall 128 of the beam 122, the fourth panel 420 forms the sidewall 130 of the beam 122, and the fifth and the sixth panels 422, 424 combine to form the sidewall 132 of the beam 122.

It should be apparent the flat substrate 400 may be formed from a plurality of substantially flat substrate sections joined together. Referring also to FIGS. 16 and 16a, in some embodiments, the substrate 400 is formed from a first substrate section 450 and a second substrate section 452. In an exemplary embodiment, the first substrate section 452 and the second substrate section 454 are mirror images of one another. However, it should be apparent to one having ordinary skill in the art that the first substrate section 452 may be identical to the second substrate 454, or the first substrate section 452 may be asymmetrical with respect to the second substrate 454 or otherwise different therefrom.

The first substrate section 450 includes a plurality of openings 456 and the second substrate 452 section includes a plurality of openings 458. In addition, referring also to FIG. 16a, a securing panel 460 includes openings 462 and 464. Each opening 462 corresponds to one of the openings 456 in the first substrate section 450 and each opening 464 corresponds to one of the openings 458 in the second substrate section 452.

The first flat substrate section 450 and the second flat substrate 452 are placed adjacent to one another. Thereafter, the securing panel 460 is placed into an overlapping relationship with the first substrate section 450 and the second substrate section 452 until each of the openings 462 of the securing panel 460 is aligned with a corresponding one of the openings 456 and each of the openings 464 is aligned with a corresponding one of the openings 458. Thereafter, a fastener as described above is passed through each opening 462 and the corresponding opening 456 and secured. Similarly, a fastener is passed through each opening 464 and the corresponding opening 458 and secured.

In some embodiments, the first substrate section 450 and the second substrate section 452 may be adhesively secured to one another.

All of the components of the display 50, except the fasteners, such as the sidewalls 56, panels 58, projecting elements 72, beams 122, and projecting element support 280 are made of substantially flat, semi-rigid substrates such as cardboard, paperboard, fiberboard, plastic, a polymer, a metal, and the like. Such components may all be made of the same material or made from different materials. Because all of these components 56, 58, 72, 122, and 280 are substantially flat, the components may easily be packaged into a relatively flat package and shipped to a destination by the provider of the display. The display 50 may be assembled on site. Once the display 50 is no longer necessary, the display 50 may once again be broken down into the components 56, 58, 72, 122, and 280 may be re-packaged and returned to the provider of the display or shipped to another retailer or event.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those having ordinary skill in the art in view of the foregoing description. It should be understood that the illustrated embodiments are exemplary only, and should not be taken as limiting the scope of the disclosure.

I claim:
1. A display system, comprising:
 a beam formed from a first substantially flat substrate, wherein the beam includes a first slot;
 a sidewall formed from a second substantially flat substrate, wherein the sidewall is joined to an end of the beam and includes a second slot; and a panel formed from a third substantially flat substrate, wherein the panel includes an interior portion and first and second tabs extending outwardly from the interior portion, wherein the first tab is inserted into the first slot and the second tab is inserted into the second slot to secure the panel to the beam and the sidewall.

2. The display system of claim 1, wherein the beam is a substantially hollow structure.

3. The display system of claim 2, wherein the first substantially flat substrate includes a plurality of lines of weakness, and the hollow structure is formed by folding the first substantially flat substrate along the lines of weakness.

4. The display system of claim 1, wherein the beam comprises a first beam, further including a second beam formed from a fourth substantially flat substrate, wherein the first beam and the second beam are joined to one another.

5. The display system of claim 4, wherein the panel includes a third tab extending outwardly from the interior portion and the second beam includes third slot, and the panel is secured to the second beam by inserting the third tab into the third slot.

6. The display system of claim 4, wherein the first beam includes a first beam sidewall and a first slit disposed in the first beam sidewall and the second beam includes a second beam sidewall and a second slit disposed in the second beam sidewall, and the first beam and the second beam are joined by sliding the first slit into the second slit.

7. The display system of claim 6, wherein the first beam includes a third beam sidewall and a third slit disposed in the first beam sidewall, wherein the third beam sidewall includes a cutout disposed between the first slit and the third slit.

8. The display system of claim 7, wherein second beam sidewall slides into the cutout.

9. The display system of claim 1, including a projecting element that projects outwardly from the interior portion of the first panel, wherein the projecting element is formed from a fourth substantially flat substrate and is at least a portion of the projecting element is secured to the first panel.

10. The display system of claim 9, further including a projecting element support formed from a first substantially flat substrate, wherein the projecting element support is secured to the first panel and is disposed between the projecting element and the first panel.

11. The display system of claim 9, wherein the projecting element is formed by securing the fourth substantially flat substrate to a fifth substantially flat substrate.

12. The display system of claim 1, wherein the sidewall is formed by securing the second substantially flat substrate to a fourth substantially flat substrate.

13. The display system of claim 12, wherein a fastener secures the second and fourth substantially flat substrates to one another.

14. A method of assembling a display, comprising:
folding a first substantially flat substrate to form a beam;
forming a sidewall from a second substantially flat substrate;
forming a panel from a third substantially flat substrate;
joining the sidewall to an end of the beam; and
securing the panel to the beam and the sidewall by inserting a first tab of the panel into a first slot disposed in the beam and a second tab of the panel into a second slot disposed in the sidewall.

15. The method of claim 14, wherein folding the first substantially flat substrate includes the step of forming a substantially hollow structure.

16. The method of claim 15, wherein forming the hollow structure includes folding the first substantially flat substrate along lines of weakness disposed therein.

17. The method of claim 14, including the further steps of forming a second beam from a fourth substantially flat substrate and joining first beam and the second beam to one another.

18. The method of claim 17, including the further step of securing the panel to the second beam by inserting a third tab of the panel into a third slot disposed in the second beam.

19. The method of claim 17, wherein the first beam includes a first beam sidewall and a first slit disposed in the first beam sidewall and the second beam includes a second beam sidewall and a second slit disposed in the second beam sidewall, wherein joining the first beam and the second beam includes the step of sliding the first slit into the second slit.

20. The method of claim 19, wherein the first beam includes a third beam sidewall, a third slit disposed in the first beam sidewall, and the third beam sidewall includes a cutout disposed between the first slit and the third slit, wherein joining the first beam and the second beam includes sliding the second beam sidewall slides into the cutout.

21. The method of claim 14, including the further step of forming a projecting element from a fourth substantially flat substrate and securing at least a portion of the projecting element to the first panel.

22. The method of claim 21, including the further steps of forming a projecting element support from a first substantially flat substrate, securing the projecting element support to the first panel such that the projecting element support is disposed between projecting element and the first panel.

23. The method of claim 21, wherein forming the projecting element includes the step of securing the fourth substantially flat substrate to a fifth substantially flat substrate.

24. The method of claim 14, wherein forming the sidewall includes the step of securing the second substantially flat substrate to a fourth substantially flat substrate.

25. The method of claim 24, wherein securing the second substantially flat substrate to the fourth substantially flat substrate includes the step of using a fastener to secure the second and fourth substantially flat substrates to one another.

* * * * *